3,419,639
OZONE-RESISTANT COMPOSITION
Anthony V. Gentile, Waterbury, Conn., assignor to Uniroyal, Inc., a corporation of New Jersey
No Drawing. Filed Feb. 24, 1966, Ser. No. 529,672
11 Claims. (Cl. 260—889)

ABSTRACT OF THE DISCLOSURE

A composition highly resistant to ozone attack is made by mixing:

(1) ethylene-propylene-non-conjugated diene terpolymer rubber ("EPDM")
(2) conjugated diene elastomer (e.g., SBR and/or NR), and
(3) certain N,N'-substituted p-phenylene diamines [e.g., N-phenyl-N'-cyclohexyl-p-phenylene diamine; N,N'-bis(1-methylheptyl)-p-phenylene diamine, etc.]

The composition is useful for making pneumatic tire sidewalls, footwear, coated fabric, etc.

---

This invention relates to an ozone-resistant composition comprising (1) ethylene-propylene-non-conjugated diene terpolymer rubber, (2) a conjugated diene elastomer, and (3) certain N,N'-substituted-phenylene diamines.

The invention is based on the unexpected discovery that a composition comprising the three said ingredients has remarkable resistance to attack by ozone. The magnitude of such resistance is far in excess of anything that could be predicted from the known effects of the ingredients themselves. There is a surprising synergistic cooperation between the ingredients when assembled in the present novel combination.

The invention contemplates blending from 5 to 40 parts (all quantities are expressed herein by weight) of ethylene-propylene-non-conjugated diene terpolymer rubber with correspondingly from 95 to 60 parts of conjugated diene elastomer, and at least 1 part of an N,N'-substituted-p-phenylene diamine selected from the group:

N-phenyl-N'-cyclohexyl-p-phenylene diamine,
N-phenyl-N'-sec.-butyl-p-phenylene diamine,
N-phenyl-N'-(1,3-dimethyl-butyl)-p-phenylene diamine,
N,N'-bis-(1,4-dimethyl pentyl)-p-phenylene diamine,
N,N'-bis-(1-ethyl-3-methyl-pentyl)-p-phenylene diamine,
and N,N'-bis-(1-methyl-heptyl)-p-phenylene diamine.

The ethylene-propylene-non-conjugated diene terpolymer rubber employed in the invention, called "EPDM," is an unsaturated, sulfur-vulcanizable elastomer, such as is made in known manner by copolymerizing ethylene and propylene (or for that matter any two or more alpha-monoolefins) with at least one copolymerizable diene, ordinarily a non-conjugated diene, such as dicyclopentadiene, 1,4-hexadiene, methylene norbornene, 1,5-cyclooctadiene or the like, including the copolymers described in British Patent 880,904, Dunlop Rubber Co., Oct. 25, 1961, U.S. Patents 2,933,480, Gresham and Hunt, Apr. 19, 1960 and 3,000,866, Tarney, Sept. 19, 1961, and Belgian Patents 623,698 and 623,741, Montecatini, Feb. 14, 1963, 3,241,600, Whitehouse, Mar. 22, 1966, the disclosures of which are hereby incorporated herein by reference. The dienic component renders the resulting terpolymer unsaturated and vulcanizable with the usual vulcanizing systems for unsaturated rubbers, including those based on sulfur and accelerators of sulfur vulcanization. If desired, the EPDM may be oil extended with, for example 15 to 100 parts or more of oil, asphalt, or the like, per 100 parts of EPDM.

The conjugated diene elastomer employed in the invention is preferably SBR, that is, styrene-butadiene copolymer rubber, or polybutadiene homopolymer rubber (whether solution-polymerized butadiene of high cis content or emulsion-polymerized butadiene rubber). There may also be employed (frequently in admixture with SBR or BR) other conjugated diene elastomers such as polyisoprene (whether natural rubber or synthetic polyisoprene rubber) or copolymers of butadiene or similar conjugated dienes with other copolymerizable monoethylenically unsaturated monomers such as acrylonitrile or vinylpyridine.

The N,N'-substituted-p-phenylene diamines employed in the present composition are known materials, disclosed for example in U.S. Patents 2,256,189, Bogemann, Sept. 16, 1941, and 2,734,808, Biswell, Feb. 14, 1956; also Belgian Patent 563,136, United States Rubber Company, Dec. 11, 1957. As indicated, at least 1 part of this chemical is employed per 100 parts of the blended rubbers. Preferably larger amounts are used, usually at least 1.5 or 2 parts. Ordinarily it is not necesary to use in excess of 4 parts, although larger quantities such as 5 or 6 parts or more may be used if desired.

The composition of the invention may further include any desired conventional compounding ingredients suitable for use with the described rubbers, notably vulcanizing ingredients, especially sulfur or equivalent sulfur curatives, accelerators, and the like, as well as fillers, pigments, plasticizers, processing aids, etc. It will also be understood that the commercial rubbers as supplied by the manufacturer already contain small amounts of antioxidant put in at the polymer plant.

The compositions may be mixed with the aid of the usual conventional rubber mixing machinery, and thereafter shaped in conventional manner, for example by extruding, calendering or molding. The composition is vulcanizable by heating under conventional curing conditions. Useful articles of all sorts may be made from the composition, such as pneumatic tires or parts thereof (e.g., sidewall, carcass, tread), mechanical goods (e.g., belts, hose), footwear, coated fabrics, etc. Articles made from the composition will be found to be highly satisfactory from the standpoint of resistance to the deteriorating effects of aging, especially from the standpoint of cracking induced by exposure to ozone, particularly under conditions of dynamic or static flexing.

The following examples will serve to illustrate the practice of the invention in more detail.

EXAMPLE 1

The following stocks are prepared:

| Ingredients | Parts | | | |
|---|---|---|---|---|
| | 1-A | 1-B | 1-C | 1-D |
| SBR | 100 | 100 | 90 | 90 |
| EPDM | | | 10 | 10 |
| N-phenyl-N'-cyclohexyl-p-phenylene diamine | | 2.0 | | 2.0 |
| Carbon black (HAF) | 50 | 50 | 50 | 50 |
| Zinc oxide | 5 | 5 | 5 | 5 |
| Stearic acid | 2 | 2 | 2 | 2 |
| Asphalt plasticizer | 3 | 3 | 3 | 3 |
| Cumarone-indene resin | 5 | 5 | 5 | 5 |
| Mercaptobenzothiazole sulfide | 0.2 | 0.2 | 0.2 | 0.2 |
| Mercaptobenzothiazole | 1.2 | 1.2 | 1.2 | 1.2 |
| Sulfur | 1.8 | 1.8 | 1.8 | 1.8 |

In the above stocks, the invention is represented by stock 1–D; the other stocks are included for purposes of comparison.

In these stocks, SBR is butadiene-styrene copolymer rubber containing 23% styrene. The EPDM is an unsaturated rubbery terpolymer of 60% ethylene, 35% propylene, and 5% dicyclopentadiene. The rubbers, N-phenyl-N'-cyclohexyl-p-phenylene diamine and carbon black, in that order, may be blended together in a Banbury mixer for 5 minutes at low speed. The remaining ingredients may then be mixed in with the exception of the sulfur. The batch may be discharged from the mixer and cooled. The cooled batch may then be returned to the mixer, sulfur added, and blended at low speeds to make the final mix.

The stocks are cured in a mold for 60 minutes at a temperature of 292° F. The cured stocks are subjected to an especially severe ozone-resistance test by exposure in an ozonometer to 50 parts per hundred million of ozone at 100° F. with the following results:

| Stock: | Hours to crack |
|---|---|
| 1-A | 24 |
| 1-B | 72 |
| 1-C | 72 |
| 1-D, O.K. after 7878 hours. | |

It will be seen that the combinations SPDM with N-phenyl-N'-cyclohexyl-p-phenylene diamine in SBR (stock 1-D) in accordance with the invention produced a synergistic improvement far in excess of anything that could be expected from the results with EPDM alone in SBR (stock 1-C), or N-phenyl-N'-cyclohexyl-p-phenylene diamine alone in SBR (stock 1-B).

The stocks ar exposed to outdoor aging at Los Angeles, Calif. with the following results:

| Stock: | Days to crack |
|---|---|
| 1-A | 20 |
| 1-B | 28 |
| 1-C | 20 |
| 1-D, O.K. after 365 days. | |

Again, the synergistic improvement made possible by the invention (stock 1-D) is demonstrated:

EXAMPLE 2

The following stocks are prepared:

| Ingredients | Parts | | | |
|---|---|---|---|---|
| | 2-A | 2-B | 2-C | 2-D |
| Natural rubber | 80 | 72 | 80 | 72 |
| SBR | 20 | 18 | 20 | 18 |
| EPDM | | | 10 | 10 |
| N-phenyl-N'-cyclohexyl-p-phenylene diamine | | 2.4 | | 2.4 |
| Carbon black (SRF) | 10 | 10 | 10 | 10 |
| Calcium carbonate | 37.5 | 37.5 | 37.5 | 37.5 |
| Zinc oxide | 3.5 | 3.5 | 3.5 | 3.5 |
| Wax | 0.5 | 0.5 | 0.5 | 0.5 |
| Phthalic anhydride | 0.2 | 0.2 | 0.2 | 0.2 |
| Tri (nonyl phenyl) phosphite | 0.1 | 0.1 | 0.1 | 0.1 |
| Chlorinated paraffin | 0.2 | 0.2 | 0.2 | 0.2 |
| 2-Benzothiazyl disulfide | 0.7 | 0.7 | 0.7 | 0.7 |
| Sulfur | 1.7 | 1.7 | 1.7 | 1.7 |

Stock 2-D represents the invention; the other stocks are for comparison. The stocks are mixed and cured as in Example 1, and similarly tested in the ozone box with the following results:

| Stock: | Hours to crack |
|---|---|
| 2-A | 8 |
| 2-B | 24 |
| 2-C | 8 |
| 2-D | 144 |

These data show the synergistic improvement made possible by the composition of the invention (stock 2-D) containing both EPDM and N-phenyl-N'-cyclohexyl-p-phenylene diamine in the NR/SBR blend, in comparison to the results obtained with N-phenyl-N'-cyclohexyl-p-phenylene diamine alone (stock 2-B) or EPDM alone (stock 2-C).

EXAMPLE 3

This example illustrates the practice of the invention using a symmetrical N,N' - substituted - p - phenylene diamine, namely, N,N' - bis(1 - methyl - heptyl) - p-phenylene diamine, and also compares the results of the invention with the inferior results obtained using a number of commercial antioxidants which are outside the invention. The formulations employed in this example are the same as are shown in Example 2, except that the antioxidants shown in Table 1 are substituted for N-phenyl - N' - cyclohexyl - p - phenylene diamine, in the amounts shown. The compounds were cured for 60' at 292° F. Table 1 shows the results of an outdoor static cracking test at Los Angeles, Calif. The superiority of the NR–SBR–EPDM blend containing N,N' - bis(1 - methylheptyl) - p - phenylene diamine is dramatically evident in Table 1.

TABLE 1

| Antioxidant (4.0 parts) | Days to crack outdoos at Los Angeles | |
|---|---|---|
| | NR-SBR compound | NR-SBR-EPDM compouRnd |
| None (blank) | 9 | 9 |
| Diisobutylene-diphenylamine reaction product ("Octamine") | 9 | 9 |
| Diphenylamine-acetone reaction product ("Aminox") | 9 | 13 |
| Phenyl-beta-naphthylamine-acetone reaction product ("Betanox Special") | 9 | 13 |
| 65% complex diarylamine-ketone reaction product and 35% N,N' diphenyl-p-phenylene diamine ("Flexamine") | 18 | 18 |
| Alkylated bis phenol ("Naugawhite") | 7 | 13 |
| 2,2'-methylene bis (4-methyl-6-tert-butyl phenol) ("2246") | 9 | 13 |
| 4,4'-thio bis(6-tert butyl-m-cresol) ("Santowhite Crystals") | 3 | 13 |
| N,N'-bis(1-methyl-heptyl)-p-phenylene diamine | 104 | (¹) |

¹ O.K. after 365 days.
NOTE.—Test terminated at 365 days.

EXAMPLE 4

This illustrates use of N - phenyl - N' - sec. - butyl-p - phenylene diamine, N - phenyl - N' - (1,3-dimethylbutyl) - p - phenylene diamine and N,N' - bis(1,4 - dimethyl - pentyl) - p - phenylene diamine in accordance with the invention, and compares their action to the inferior results obtained with certain other antioxidants. The compounds employed are the same as in Example 2, except for substitution of the chemicals shown in Table 2 in the amounts shown, for N - phenyl - N' - cyclohexyl - p - phenylene diamine. The compounds were cured for 60' at 292° F. Table 2 shows the results of ozone box exposures and demonstrates the synergistic action of the invention in NR–SBR–EPDM blends.

TABLE 2

| Antioxidant (parts) | Hours to crack in ozone box at 50 p.p.h.m./100° F. | |
|---|---|---|
| | NR-SBR compound | NR-SBR-EPDM compound |
| None (blank) | 8 | 8 |
| 2.0 N-phenyl-N'-sec.-butyl-p-phenylene diamine | 144 | 228 |
| 4.0 N-phenyl-N'-sec. butyl-p-phenylene diamine | 144 | (¹) |
| 2.0 N-phenyl-N'-(1,3-dimethyl-butyl)-p-phenylene diamine | 8 | 312 |
| 4.0 N-phenyl-N'-(1,3-dimethyl-butyl)-p-phenylene diamine | 144 | (¹) |
| 2.0 N,N'-bis(1,4-dimethyl-pentyl)-p-phenylene diamine | 678 | (¹) |
| 4.0 N,N'-bis(1,4-dimethyl-pentyl)-p-phenylene diamine | 4,044 | (¹) |
| 4.0 p(p-toluene-sulfonyl amido) diphenylamine ("Aranox") | 8 | 8 |
| 4.0 diphenylamine-acetone condensation product ("BLE-25") | 8 | 8 |

¹ O.K. after 6708 hours.

EXAMPLE 5

The results of outdoor static cracking tests at Naugatuck, Conn. and Los Angeles, Calif. are shown in Table 3, using N - phenyl - N' - sec.-butyl - p - phenylene diamine and N - phenyl - N' - (1,3 - dimethylbutyl) - p - phenylene diamine in accordance with the invention, in contrast to certain other antioxidants.

TABLE 3

| Antioxidant (parts) | Days to crack outdoors statically | | | |
|---|---|---|---|---|
| | At Naugatuck | | At Los Angeles | |
| | NR-SBR | NR-SBR-EPDM | NR-SBR | NR-SBR-EPDM |
| Blank (none) | 100 | 122 | 63 | 76 |
| 2.0 N-phenyl-N'-sec.-butyl-p-phenylene diamine | 203 | (¹) | 191 | (²) |
| 2.0 N-phenyl-N'-(1,3-dimethyl-butyl)-p-phenylene diamine | 203 | (³) | 162 | (⁴) |
| 4.0 p(p-toluene-sulfonyl amido)diphenylamine ("Aranox") | 100 | 175 | 76 | 76 |
| 4.0 diphenylamine-acetone condensation product ("BLE") | 139 | 158 | 76 | 86 |

¹ O.K. after 292 days.
² VS after 278 days.
³ VVS after 292 days.
⁴ O.K. after 301 days.

NOTE.—VVS indicates very, very slight cracking; VS indicates very slight cracking.

EXAMPLE 6

Table 4 shows results obtained with SBR-EPDM blends containing various N,N'-substituted-p-phenylene diamines in accordance with the invention, using HAF carbon black formulations in accordance with Example 1, except that the chemicals shown in Table 4 are substituted for the N-phenyl-N'-cyclohexyl-p-phenylene diamine of Example 1, in the amounts shown in Table 4. Again, the compositions were cured for 60' at 292° F.

TABLE 4

| Antioxidant (parts) | Days to crack outdoors in SBR-HAF black compound | | | |
|---|---|---|---|---|
| | At Naugatuck | | At Los Angeles | |
| | SBR compound | SBR-EPDM compound | SBR compound | SBR-EPDM compound |
| None (blank) | 19 | 46 | 82 | 65 |
| 1.0 N-phenyl-N'-sec.-butyl-p-phenylene diamine | 125 | (¹) | 179 | (²) |
| 1.5 N-phenyl-N'-sec.-butyl-p-phenylene diamine | 125 | (¹) | 257 | (²) |
| 1.5 N,N'-bis(1,4-dimethyl-pentyl) p-phenylene diamine | 147 | (¹) | 224 | (²) |
| 1.0 N,N'-bis(1-ethyl-3-methyl-pentyl)-p-phenylene diamine | 46 | (¹) | 62 | (²) |

¹ O.K. after 323 days.
² O.K. after 328 days.

Table 4 shows the remarkable resistance of the compositions of the invention to cracking an outdoor exposure.

Having thus described my invention, what I claim and desire to protect by Letters Patent is:

1. An ozone-resistant composition comprising a vulcanized mixture containing from 5 to 40 parts of ethylene-propylene-non-conjugated diene terpolymer rubber, correspondingly from 95 to 60 parts of a conjugated diene elastomer, and from 1 to 6 parts of a chemical selected from the group:
   N-phenyl-N'-cyclohexyl-p-phenylene diamine,
   N-phenyl-N'-sec.-butyl-p-phenylene diamine,
   N-phenyl-N'-(1,3-dimethyl-butyl)-p-phenylene diamine,
   N,N'-bis-(1,4-dimethyl pentyl)-p-phenylene diamine,
   N,N'-bis-(1-ethyl-3-methyl-pentyl)-p-phenylene diamine, and
   N,N'-bis-(1-methyl-heptyl)-p-phenylene diamine.

2. A composition as in claim 1 in which the conjugated diene elastomer is styrene-butadiene copolymer, or styrene-butadiene copolymer rubber in admixture with natural rubber.

3. A composition as in claim 1 in which the non-conjugated diene in said terpolymer is dicyclopentadiene.

4. A sulfur-vulcanized composition as in claim 3.

5. A composition as in claim 4 in which the conjugated diene elastomer is styrene-butadiene copolymer.

6. A composition as in claim 1 in which the chemical is N-phenyl-N'-cyclohexyl-p-phenylene diamine.

7. A composition as in claim 1 in which the chemical is N-phenyl-N'-sec.-butyl-p-phenylene diamine.

8. A composition as in claim 1 in which the chemical is N-phenyl-N'-(1,3-dimethyl-butyl)-p-phenylene diamine.

9. A composition as in claim 1 in which the chemical is N,N'-bis-(1,4-dimethyl pentyl)-p-phenylene diamine.

10. A composition as in claim 1 in which the chemical is N,N'-bis-(1-ethyl-3-methyl-pentyl)-p-phenylene diamine.

11. A composition as in claim 1 in which the chemical is N,N'-bis-(1-methyl-heptyl)-p-phenylene diamine.

References Cited

UNITED STATES PATENTS

| 3,224,985 | 12/1965 | Gladding et al. | 260—5 |
| 3,331,793 | 7/1967 | Souffie | 260—4 |
| 3,343,582 | 9/1967 | Himes | 260—5 |
| 3,356,764 | 12/1967 | Gentile | 260—889 |

DONALD E. CZAJA, *Primary Examiner*.

HOSEA E. TAYLOR, JR., *Assistant Examiner*.

U.S. Cl. X.R.

260—5, 41.5, 28.5, 45.7, 45.9, 727, 754, 793, 757, 809